(12) United States Patent
Luo et al.

(10) Patent No.: US 12,033,511 B2
(45) Date of Patent: Jul. 9, 2024

(54) SERVER, VEHICLE OPERATION MANAGEMENT METHOD, VEHICLE, AND VEHICLE OPERATION MANAGEMENT SYSTEM

(71) Applicant: Toyota Jidosha Kabushiki Kaisha, Toyota (JP)

(72) Inventors: Changyi Luo, Kokubunji (JP); Ayana Takeshita, Kasugai (JP); Yuhei Suzuki, Kariya (JP); Michael C. Edwards, McKinney, TX (US); Chris Risberg, Flower Mound, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 17/393,734

(22) Filed: Aug. 4, 2021

(65) Prior Publication Data

US 2022/0044571 A1 Feb. 10, 2022

(30) Foreign Application Priority Data

Aug. 7, 2020 (JP) .................................. 2020-135384

(51) Int. Cl.
*G08G 1/00* (2006.01)
*B60W 60/00* (2020.01)
*G06Q 50/00* (2024.01)

(52) U.S. Cl.
CPC ......... *G08G 1/202* (2013.01); *B60W 60/0013* (2020.02); *B60W 60/00253* (2020.02);
(Continued)

(58) Field of Classification Search
CPC .......... G08G 1/202; G08G 1/205; G08G 1/22; B60W 60/0013; B60W 60/00253; B60W 2556/65; G06Q 50/01
See application file for complete search history.

(56) References Cited

U.S. PATENT DOCUMENTS 9,873,439 B2 * 1/2018 Moritzhuber ........... B61B 12/00
10,252,721 B1 4/2019 Bai
(Continued)

FOREIGN PATENT DOCUMENTS

CN 104616105 A 5/2015
CN 107614359 A 1/2018
(Continued)

*Primary Examiner* — Jelani A Smith
*Assistant Examiner* — Nada Mahyoob Alqaderi
(74) *Attorney, Agent, or Firm* — Dinsmore & Shohl LLP

(57) ABSTRACT

A server manages operation of a plurality of vehicles that are autonomous and used for transporting a plurality of users. The server includes a server communication interface and a server controller. The server communication interface is configured to be able to transmit/receive information to/from the plurality of vehicles. The server controller is configured to be able to transmit, via the server communication interface, an instruction to couple a first vehicle and a second vehicle which are included in the plurality of vehicles to thereby form a vehicle group which includes the first vehicle and the second vehicle in a coupled state, and control the first vehicle and the second vehicle so that a user in either one vehicle of the first vehicle and the second vehicle can move to another vehicle, and an instruction to release at least part of the coupled state of the vehicle group.

18 Claims, 13 Drawing Sheets

(52) U.S. Cl.
CPC ............ *G06Q 50/01* (2013.01); *G08G 1/205* (2013.01); *G08G 1/22* (2013.01); *B60W 2556/65* (2020.02)

(56) References Cited

U.S. PATENT DOCUMENTS

| | | |
|---|---|---|
| 2006/0170188 A1 | 8/2006 | Negre et al. |
| 2006/0178949 A1 | 8/2006 | McGrath |
| 2010/0162916 A1* | 7/2010 | Lechner ................. B66B 21/12 104/20 |
| 2015/0363986 A1* | 12/2015 | Hoyos ................ G07C 9/00571 340/5.61 |
| 2017/0146354 A1* | 5/2017 | Boss .................. G01C 21/3438 |
| 2017/0300848 A1 | 10/2017 | Shoval et al. |
| 2018/0022405 A1 | 1/2018 | Gecchelin et al. |
| 2018/0312179 A1* | 11/2018 | Lucisano ............ B61L 15/0081 |
| 2019/0122561 A1* | 4/2019 | Shimizu ................. G07C 5/008 |
| 2019/0195982 A1 | 6/2019 | El Assaad |
| 2019/0232992 A1* | 8/2019 | Bondaryk ................. B62B 3/02 |
| 2019/0385461 A1* | 12/2019 | Blomstrand ............. B60D 1/44 |
| 2020/0055530 A1* | 2/2020 | Malik ...................... B61K 1/00 |
| 2020/0143295 A1* | 5/2020 | Sakurada .......... B60W 60/0025 |
| 2021/0380126 A1* | 12/2021 | Liu ..................... G06Q 10/047 |

FOREIGN PATENT DOCUMENTS

| | | | | |
|---|---|---|---|---|
| DE | 102012107666 A1 | * | 2/2014 | ............ B61D 17/20 |
| JP | 2005-535491 A | | 11/2005 | |
| JP | 2018-094955 A | | 6/2018 | |
| JP | 2019-075047 A | | 5/2019 | |
| JP | 2019-200562 A | | 11/2019 | |
| NL | 1035873 C | * | 3/2010 | ............ B61B 13/04 |
| WO | WO-2014029785 A1 | * | 2/2014 | ............ B61D 17/20 |
| WO | WO-2020010778 A1 | * | 1/2020 | |

\* cited by examiner ized, each vehicle is independent, and it has not been assumed that users move from vehicle to vehicle. For this reason, in a case in which vehicles boarded by a plurality of users with different destinations are platooned, there is room for improvement in terms of convenience for transport of the users.

SERVER, VEHICLE OPERATION MANAGEMENT METHOD, VEHICLE, AND VEHICLE OPERATION MANAGEMENT SYSTEM

CROSS-REFERENCE TO RELATED APPLICATION

This application claims priority to Japanese Patent Application No. 2020-135384 (filed on Aug. 7, 2020), the entire contents of which are incorporated herein by reference.

TECHNICAL FIELD

The present disclosure relates to a server, a vehicle operation management method, a vehicle, and a vehicle operation management system.

BACKGROUND

Platooning in which a plurality of vehicles drives in line with a short distance between each other is known. For example, Patent Literature 1 (PTL 1) discloses a method for automatically controlling a distance between platooning vehicles so as to reduce energy consumption.

CITATION LIST

Patent Literature

PTL 1: US 2019-0195982 A1

SUMMARY

According to existing technology, even when a plurality of vehicles is platooned, each vehicle is independent, and it has not been assumed that users move from vehicle to vehicle. For this reason, in a case in which vehicles boarded by a plurality of users with different destinations are platooned, there is room for improvement in terms of convenience for transport of the users.

It would be helpful to improve convenience in a service in which a plurality of vehicles is shared and used by a plurality of users.

A server according to an embodiment of the present disclosure manages operation of a plurality of vehicles that are autonomous and used for transporting a plurality of users, and the server includes a server communication interface and a server controller. The server communication interface is configured to be able to transmit/receive information to/from the plurality of vehicles. The server controller is configured to be able to transmit, via the server communication interface, an instruction to couple a first vehicle and a second vehicle which are included in the plurality of vehicles to thereby form a vehicle group which includes the first vehicle and the second vehicle in a coupled state, and control the first vehicle and the second vehicle so that a user in either one vehicle of the first vehicle and the second vehicle can move to another vehicle, and an instruction to release at least part of the coupled state of the vehicle group.

A vehicle operation management method according to an embodiment of the present disclosure is a vehicle operation management method for managing operation of a plurality of vehicles that are autonomous and used for transporting a plurality of users. The vehicle operation management method includes: coupling a first vehicle and a second vehicle which are included in the plurality of vehicles to thereby form a vehicle group which includes the first vehicle and the second vehicle in a coupled state; controlling the first vehicle and the second vehicle so that a user in either one vehicle of the first vehicle and the second vehicle can move to another vehicle; and releasing at least part of the coupled state of the vehicle group.

A vehicle according to an embodiment of the present disclosure is a vehicle included in a plurality of vehicles that are autonomous and used for transporting a plurality of users, and operation of the vehicle is managed by a server. The vehicle includes a vehicle communication interface and a vehicle controller. The vehicle communication interface is configured to be able to transmit/receive information to/from the server. The vehicle controller is configured to perform processing of being coupled with another vehicle that is included in the plurality of vehicles to thereby form a coupled state based on an instruction received from the server via the vehicle communication interface so that a user who boards can move between the vehicle and the other vehicle, and processing of releasing at least part of the coupled state with the other vehicle.

A vehicle operation management system according to an embodiment of the present disclosure includes the server and the vehicle.

According to the present disclosure, convenience in a service in which a plurality of vehicle is shared and used by a plurality of users can be improved.

DETAILED DESCRIPTION

The following describes an embodiment of the present disclosure with reference to the drawings. The drawings used in the following description are schematic. Dimensional ratios or the like on the drawings do not necessarily match actual ones.

Figure 1:
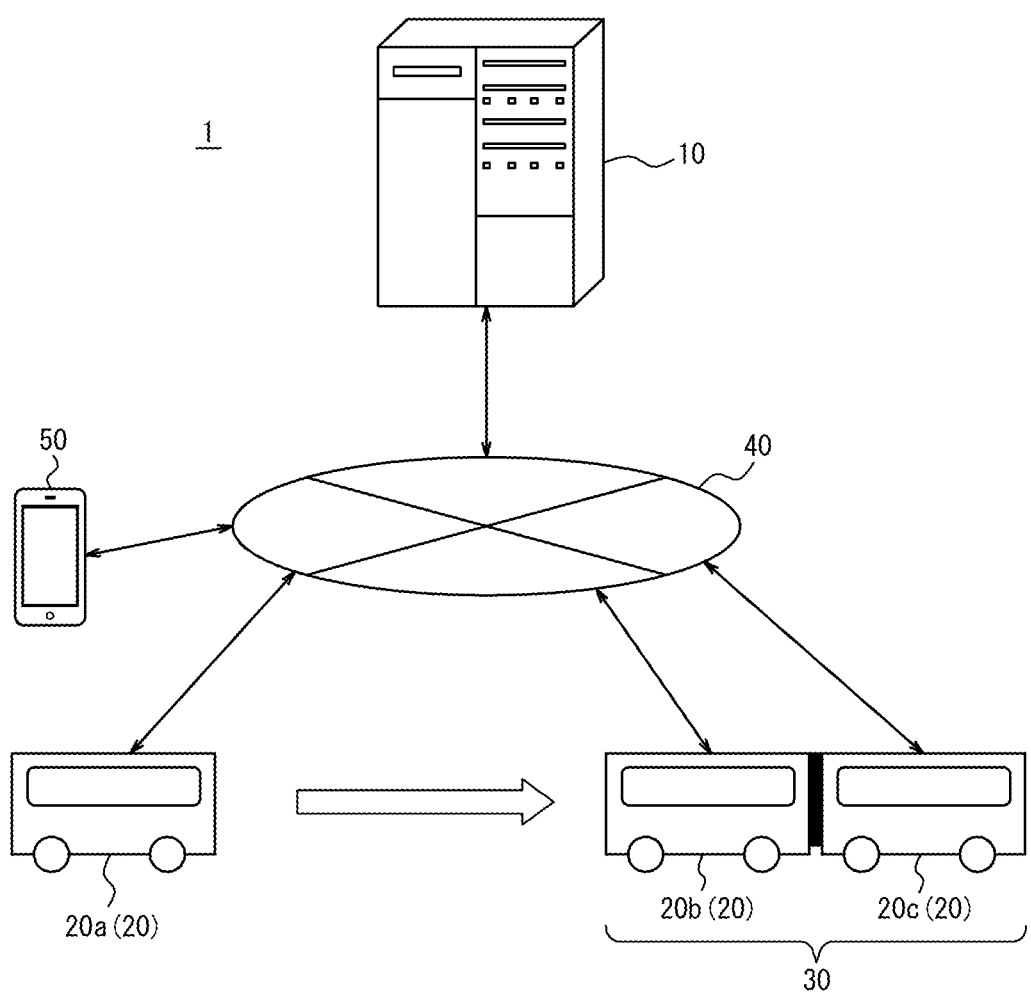
FIG. 1 schematically illustrates an example configuration of a vehicle operation management system according to an embodiment.

With reference to FIG. 1, an outline of a vehicle operation management system 1 according to an embodiment of the present disclosure will be described. The vehicle operation management system 1 can be used to provide Mobility-as-a-Service (MaaS). For example, a service provider may provide a ride-sharing service (hereinafter, referred to as an automated driving and ride-sharing service) using a server 10 and vehicles 20 that are capable of driving autonomously in accordance with instructions from the server 10. In the vehicle operation management system 1 herein, it is in particular assumed that a plurality of users with different destinations boards autonomous vehicles in the form of shared taxis. A user who wants to use the automated driving and ride-sharing service requests vehicle dispatch from his or her user terminal 50 and boards a vehicle 20 passing nearby. The use of the vehicle operation management system 1 of the present disclosure is, however, not limited to the service in the form of shared autonomous taxis.

The vehicle operation management system 1 includes the server 10 and a plurality of vehicles 20a-20c. Although in FIG. 1 only the three vehicles 20 are illustrated, the number of vehicles 20 that are managed by the vehicle operation management system 1 is not limited to this. Hereinafter, any vehicle that is not identified as one of the vehicles 20a-20c shall be referred to as a "vehicle 20" as appropriate. The server 10 manages operations of vehicles 20. The vehicles 20 are vehicles that can board a plurality of users and drive autonomously in accordance with instructions from the server 10. A plurality of vehicles 20 may be mechanically or electronically controlled and coupled with each other to thereby form a vehicle group 30 in a coupled state for platooning. Formation of a vehicle group 30 driving together is called platooning. The server 10 and a vehicle 20 can communicate via a network 40. A user can communicate with the server 10 via the user terminal 50. The configurations of components of the vehicle operation management system 1 will be described below.

(Server)

Figure 2:
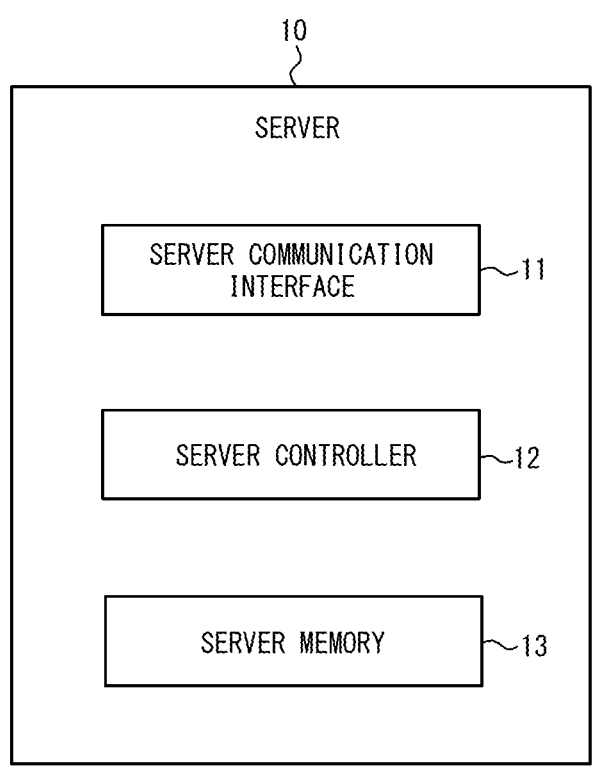
FIG. 2 is a block diagram illustrating a schematic configuration of a server of FIG. 1.

As illustrated in FIG. 2, the server 10 includes a server communication interface 11, a server controller 12, and a server memory 13. The server 10 is not limited to a single type of hardware and may be configured by a plurality of types of hardware connected by a Local Area Network (LAN) or the like. Further, a plurality of types of hardware equipped with the function of the server 10 can be arranged in a geographically distributed manner via the network 40.

The server communication interface 11 includes a communication module for connection with the network 40. The communication module may include communication modules compliant with various communication standards, such as wired LANs, wireless LANs, optical communication lines, or digital subscriber lines. The server communication interface 11 can perform processing, such as protocol processing pertaining to information transmission and receipt, modulation of transmitted signals, or demodulation of received signals. In the present embodiment, the server 10 is connected to the network 40 via the server communication interface 11.

The server communication interface 11 can receive various types of information from a vehicle 20 or a user terminal 50. For instance, the server communication interface 11 may receive a coupling request from a vehicle 20 for coupling with another vehicle 20. For another instance, the server communication interface 11 may receive, from a user terminal 50, a boarding request to board a vehicle 20. The server communication interface 11 may transmit various types of information to a vehicle 20. For example, the server communication interface 11 may transmit, to a vehicle 20, a coupling instruction for coupling with another vehicle 20.

The server controller 12 includes a single processor or a plurality of processors. In the present disclosure, processors include general purpose processors that execute programmed functions by loading a specific program, and dedicated processors that are dedicated to specific processing. Dedicated processors may include Digital Signal Processors (DSPs), Application Specific Integrated Circuits (ASICs), Field-Programmable Gate Arrays (FPGAs), and the like. The server controller 12 may further include a memory. The memory can store a program executed by a processor, information being operated by the processor, and the like. The memory and the processor are connected by a bus line, such as a data bus and a control bus. The memory may include Read Only Memory (ROM), Random Access Memory (RAM), flash memory, and the like. RAM may include Dynamic Random Access Memory (DRAM) and Static Random Access Memory (SRAM).

The server controller 12 controls operation of the entire server 10. Processing performed by the server 10 may be referred to as processing performed by the server controller 12. The server controller 12 transmits and receives information to and from a vehicle 20 and a user terminal 50 via the server communication interface 11. Based on information transmitted and received, the server controller 12 manages operations of the vehicles 20. The server controller 12 can calculate optimal routes of vehicles 20 based on a boarding request from a user.

The server controller 12 manages vehicle information, that is, information regarding the vehicles 20 included in the vehicle operation management system 1. The server controller 12 manages user information, that is, information regarding the users who use the vehicle operation management system 1. The vehicle information and the user information may be updated based on information transmitted and received to and from a vehicle 20 and/or a user terminal 50. The vehicle information and the user information are stored in the server memory 13.

The server memory 13 stores any information used for operation of the server 10. The server memory 13 includes a semiconductor storage device, a magnetic storage device, and an optical storage device. Semiconductor storage devices may include memories, such as Read Only Memory (ROM), Random Access Memory (RAM), or flash memory. RAM may include Dynamic Random Access Memory (DRAM) and Static Random Access Memory (SRAM). Semiconductor memory devices include SSD (Solid State Drive) using flash memory, and the like. Magnetic storage devices include magnetic tapes, Floppy® disks (Floppy is a registered trademark in Japan, other countries, or both), hard disks, etc., and drive apparatuses thereof. Optical storage devices include, for example, Compact Discs (CDs), Digital Versatile Discs (DVDs), and Blu-ray® (Blu-ray is a registered trademark in Japan, other countries, or both), etc., and drive apparatuses thereof.

Figure 3:
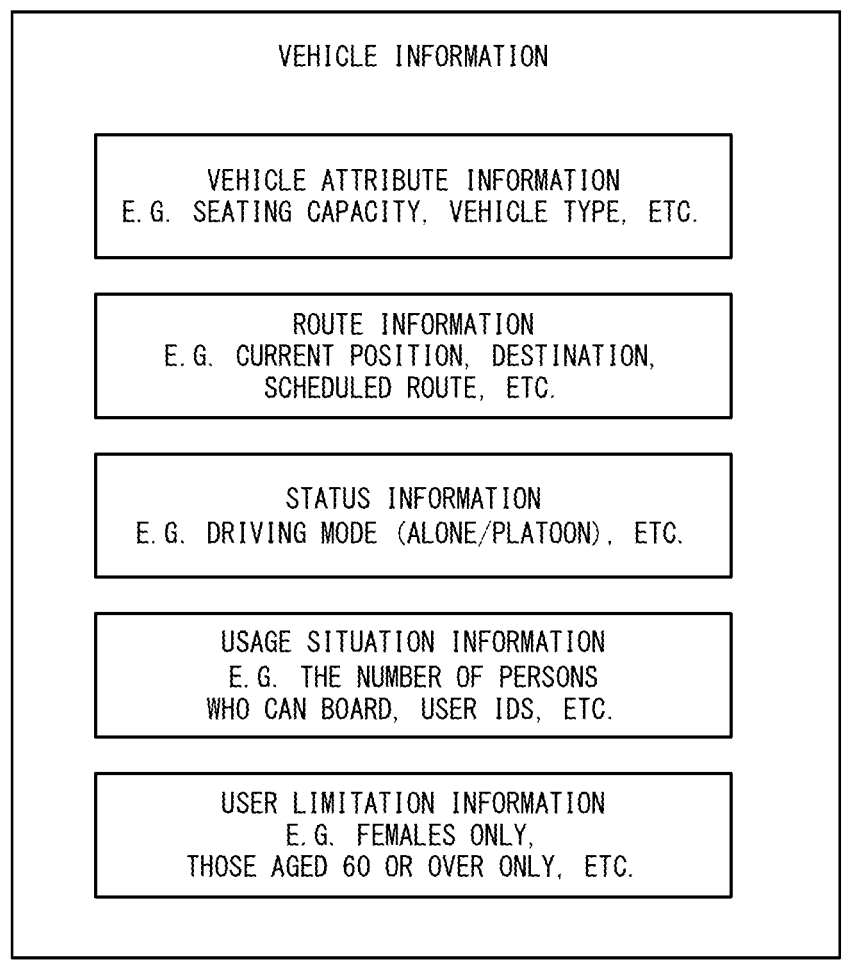
FIG. 3 is a diagram illustrating an example of vehicle information managed by the server.

As illustrated in FIG. 3, the vehicle information may include, for each vehicle 20, vehicle attribute information, route information, status information, usage situation information, and/or user limitation information.

The vehicle attribute information is information indicating, for each vehicle 20, an attribute unique to that vehicle 20. The vehicle attribute information may be inputted by a provider of the automated driving and ride-sharing service when information for the vehicle 20 is initially registered in the server 10. The vehicle attribute information includes, for example, information regarding the seating capacity, the vehicle model, the vehicle type, and the like of the vehicle 20. The vehicle type indicates a type, such as a heavy-duty vehicle, a light-duty vehicle, or an open car. When making a boarding request, a user may specify the type of vehicle 20 that he or she wants to board. In that case, the vehicle 20 that the user is to board is selected from vehicles 20 conforming to the vehicle type.

The route information is information regarding a route along which the vehicle 20 is currently driving. The route information includes, for example, information regarding the current position, the destination, the scheduled route, and the like. Information regarding the current position may be updated to the latest information by exchanging information with the vehicle 20. The destination and the scheduled route may be set by the server 10 in accordance with destinations of a plurality of users who are on board the vehicle 20 and may be transmitted to the vehicle 20.

The status information indicates the current status of the vehicle 20. The status information may include information indicating which one of driving modes, such as driving alone or platooning, the vehicle 20 is currently in. The status information may also include information, such as whether in normal operation or in a failure status. The server 10 may periodically acquire status information from the vehicle 20.

The usage situation information indicates the current usage situation of the vehicle 20. The usage situation information may include, for example, the number of persons who can currently board and user IDs, that is, identification information for users who are on board. The number of persons who can board is calculated by subtracting the number of users currently on board from the seating capacity. The vehicle 20 may be boarded by an additional user in a case in which the number of persons who can board is not zero. The user IDs can be used to associate the users who are on board the vehicle 20 with the later-described user information.

The user limitation information is information that defines the content of a limitations in a case in which the limitation is imposed on profiles of users who can board specific vehicles 20. The user limitation information includes, for example, information, such as females only, those aged 60 or over only, fans of a specific sports team only, or persons with a specific hobby only. The provider of the automated driving and ride-sharing service may limit users of a certain number of vehicles 20 in advance. Alternatively, users can be limited based on a boarding request from the first user who has boarded a specific vehicle 20.

The above-described method for classifying the vehicle information is merely an example. The vehicle information may include various types of information including the information illustrated in FIG. 3.

Figure 4:
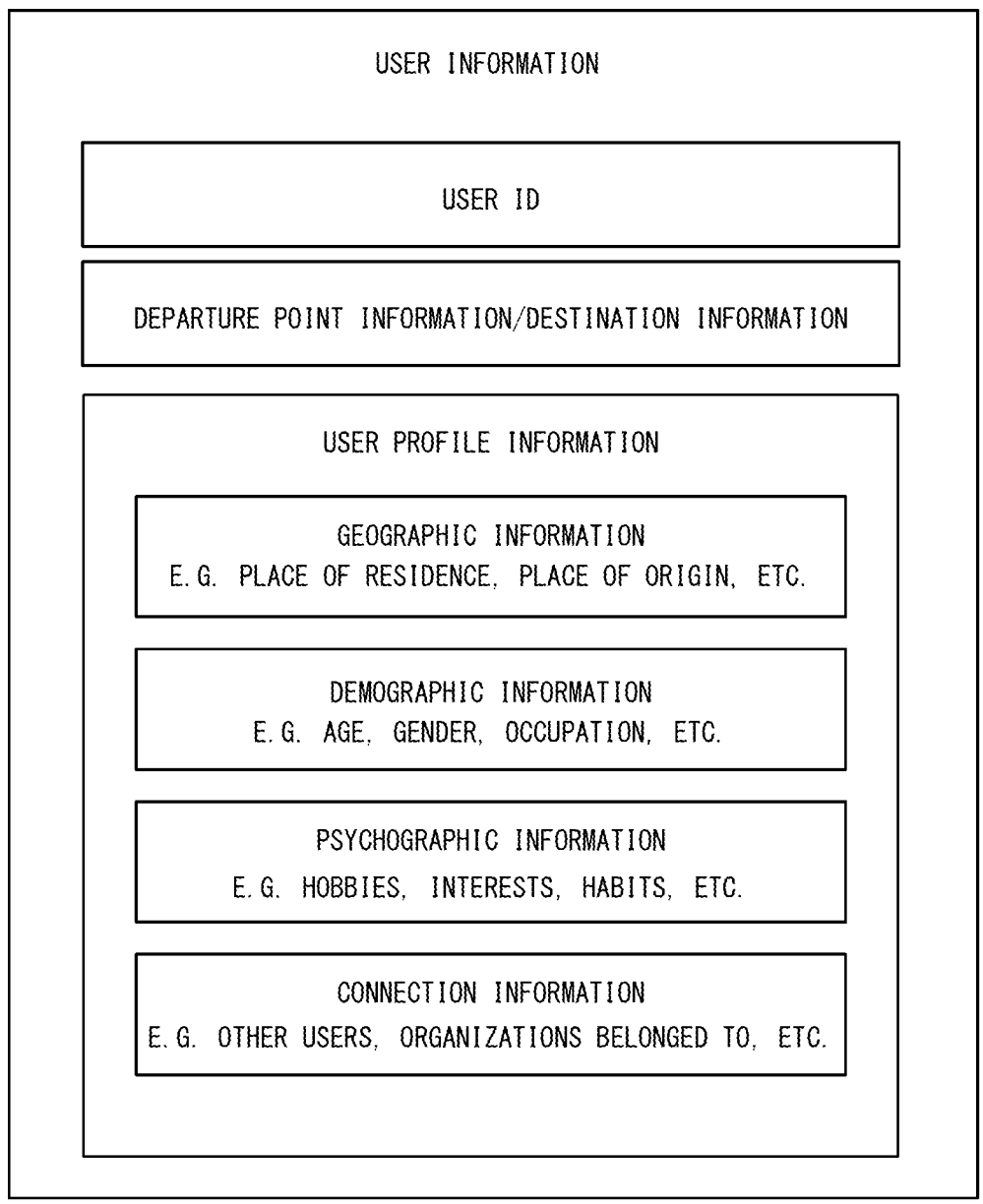
FIG. 4 is a diagram illustrating an example of user information managed by the server.

As illustrated in FIG. 4, the user information includes, for each user, a user ID, and departure point information and destination information for the user.

The departure point information and the destination information are transmitted to the server when a user transmit a boarding request using the user terminal 50. The server 10 acquires the departure point information and the destination information from the boarding request. The departure point information and the destination information can be used by the server controller 12 to search for a vehicle 20 to be boarded by the user. The departure point information and the destination information can be used by the server controller 12 to determine a vehicle 20 for transferring the user. The departure point information and the destination information may be stored with their past histories being included. The server controller 12 can use the departure point information and the destination information to charge the user.

The user information may further include user profile information indicating characteristics of the user. The user profile information may be used by the server controller 12 to determine whether a plurality of vehicles 20 can be coupled. For example, the server controller 12 may control coupling between vehicles 20 so that a plurality of users who bear a close similarity to each other in terms of user profile information can board vehicles 20 belonging to the same vehicle group 30 so as to activate communication between the users.

The user profile information may include, for example, geographic information, demographic information, and psychographic information. The geographical information includes information regarding place of residence, place of origin, and the like. The demographic information includes information regarding age, gender, occupation, and the like. The psychographic information includes information regarding hobbies, interests, habits, and the like. These categories of the user profile information are merely examples. The user profile information can also be classified in other ways. The user profile information may be registered by the user himself/herself when the user uses a service provided by the vehicle operation management system 1 for the first time.

The user profile information may further include connection information indicating connections with other users. The connection information may be a list of user IDs of other users who have connections with the user. Other users who have connections with the user are, for example, family, friends, acquaintances, or the like of the user. The server controller 12 may determine other users who have connections from among fellow passengers of the user during his or her previous use of the vehicle operation management system 1. The server controller 12 may be configured to acquire information regarding friends of the user from a server providing a service on the Internet, such as, a Social Networking Service (SNS). The connection information may further include information regarding organizations that the user belongs to. Organizations belonged to include a school, a fan club of a specific sports team, and the like.

The server controller 12 can manage operations of vehicles 20 by transmitting and receiving various types of information to and from the vehicles 20. For example, when a boarding request is received from a user via the user terminal 50, the server controller 12 can extract a plurality of vehicles 20 from among vehicles 20 in operation and calculate an optimal route including a transfer between the vehicles 20.

In a case in which the user needs to transfer between two vehicles 20, based on the destination of the user, the server 10 may transmit, to both or one of the two vehicles 20 via the server communication interface 11, an instruction to couple the two vehicles 20 with each other to thereby form a coupled state. The server 10 may control each of the vehicles 20 so that the user can move between the two coupled vehicles 20. The server controller 12 may also instruct release of the coupling between the two vehicles 20.

Further, based on a coupling request or the like from a user who is on board a vehicle 20, the server 10 may determine whether the vehicle 20 and another vehicle 20 or a vehicle group 30 can be coupled and instruct that the vehicle 20 and the other vehicle 20 or the vehicle group 30 be coupled. The server 10 may determine another vehicle 20 to be coupled with the vehicle 20, based on user profile information of respective users who board the vehicles 20. The server controller 12 may quantify and evaluate a similarity between user profiles of the users who board the vehicles 20 and, when there is a close similarity between the respective users of the vehicles 20, determine that the vehicles 20 can be coupled with each other.

(Vehicle)

Figure 5:
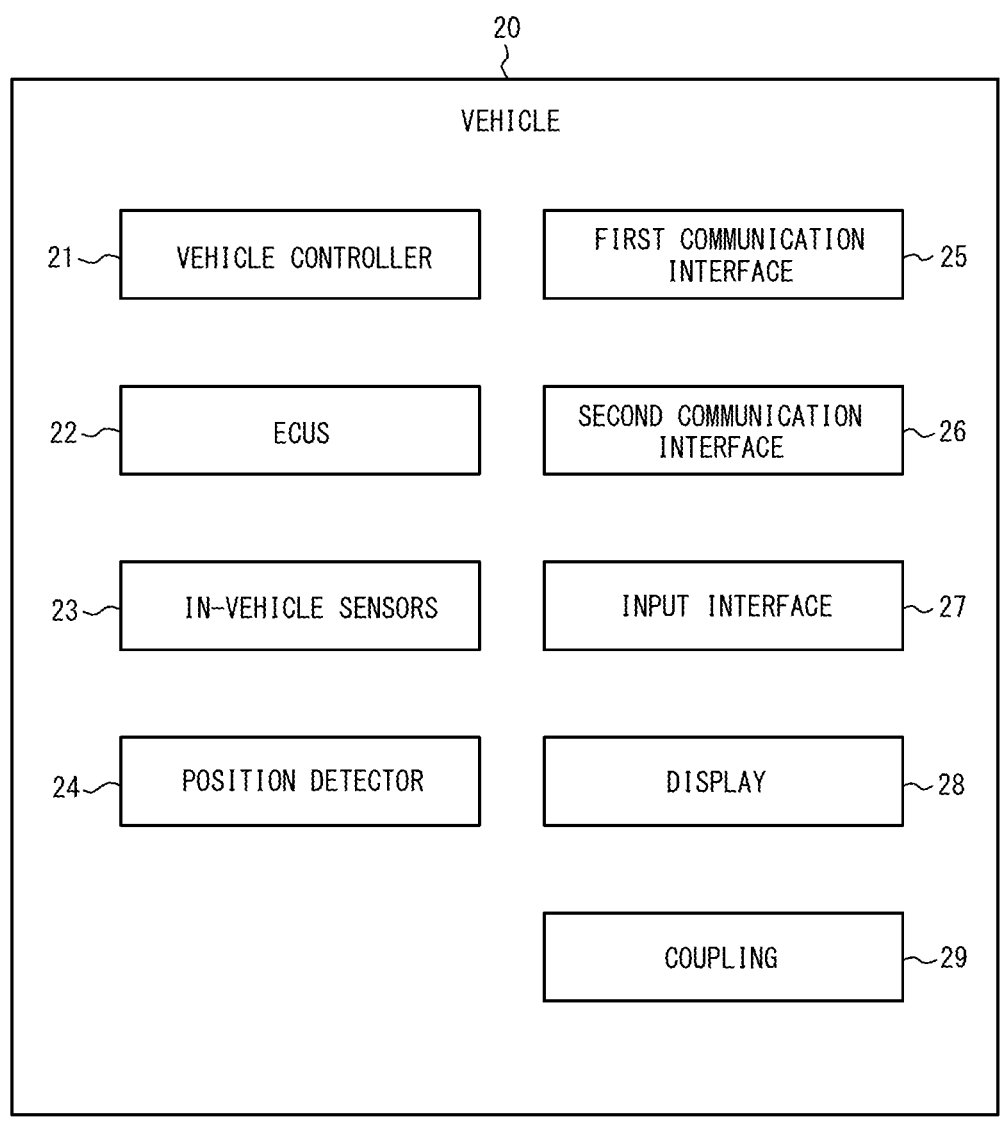
FIG. 5 is a block diagram illustrating a schematic configuration of a vehicle of FIG. 1.

As illustrated in FIG. 5, a vehicle 20 includes a vehicle controller 21, a plurality of ECUs 22, a plurality of in-vehicle sensors 23, a position detector 24, a first communication interface 25, and a second communication interface 26. The vehicle 20 may further include an input interface 27, a display 28, and a coupling 29. The components of the vehicle 20 are connected to each other by an in-vehicle network, such as a Controller Area Network (CAN), in the vehicle 20.

The vehicle controller 21 controls the entire vehicle 20. Processing performed by the vehicle 20 can be referred to as processing performed by the vehicle controller 21. The vehicle controller 21 includes a single processor or a plurality of processors and a memory, as is the case described for the server controller 12. The vehicle controller 21 controls driving of the vehicle 20 in accordance with an instruction received from the server 10 via the first communication interface 25. The memory of the vehicle controller 21 may store information on a road map. The vehicle controller 21 cooperates with the ECUs 22, the in-vehicle sensors 23, and the position detector 24 to thereby achieve automated driving of the vehicle 20. The automated driving may include, for example, any level from Level 1 to Level 5 as defined by the Society of Automotive Engineers (SAE), but is not limited to these, and may be defined in any way. In the present embodiment, the vehicle 20 will be described as being capable of driverless automated driving (e.g., Level 5 automated driving defined by the SAE).

Based on an instruction from the server 10, the vehicle controller 21 controls the components of the vehicle 20, including the ECUs 24, to perform automated driving along a route as instructed by the server 10. Based on an instruction from the server 10, the vehicle controller 21 controls each component of the vehicle 20 so as to allow a user to board at a predetermined position and alight at another predetermined position.

The vehicle controller 21 is configured so that the vehicle 20 and another vehicle 20 can be coupled with each other to thereby form a vehicle group 30 capable of platooning. During platooning, the vehicle controller 21 can transmit and receive control information to and from another vehicle 20. The control information for vehicles 20 includes information regarding acceleration, braking, lane changes, and the like required to maintain platooning.

The ECUs 22 are a plurality of Electronic Control Units (ECUs) that control pieces of equipment in the vehicle 20. The equipment in the vehicle 20 includes, but is not limited to, an engine, a motor, a brake, a transmission, and a navigational system. The ECUs 22 are connected with each other via a network, such as the Controller Area Network (CAN).

The in-vehicle sensors 23 include various sensors mounted on the vehicle 20. Most of the in-vehicle sensors 23 are interconnected with the ECUs 24 and can be used for driving control. The in-vehicle sensors 23 used for driving control include, but are not limited to, vehicle speed sensors, acceleration sensors, brake sensors, sensors for forward distance between vehicles, sensors for backward distance between vehicles, driving lane detection sensors, and image sensors.

The position detector 24 detects the position of the vehicle 20. The position of the vehicle 20 may be detected as an absolute position in latitude and longitude, etc. The position detector 24 may include any of various detecting apparatuses, including receiving apparatuses compliant with Global Navigation Satellite System (GNSS), orientation sensors, steering angle sensors, and range sensors. GNSS can measure the position of the vehicle 20 using artificial satellites. By using signals from a GNSS receiving apparatus, information regarding the latitude and longitude at the current position of the vehicle 20 may be acquired. As the receiving apparatus compliant with GNSS, a Global Positioning System (GPS) receiving apparatus may be employed. The position detector 24 may also employ receiving apparatuses compliant with other types of GNSS, instead of GPS receiving apparatuses or in addition to GPS receiving apparatuses. Other types of GNSS include, for example, satellite positioning systems using quasi-zenith satellites. In places in which it is not possible to receive the current position using a GPS receiving apparatus, the current position may be detected by dead reckoning using both azimuth sensors, such as gyro sensors, and distance sensors.

The first communication interface 25 includes a communication module that is connected to the network 40 and that communicates with the server 10. The communication module includes, but is not limited to, a communication module compliant with a mobile communication standard, such as the 4th Generation (4G) standard or the 5th Generation (5G) standard. The first communication interface 25 is vehicle communication interface.

The second communication interface 26 includes a communication module for communicating with vehicles 20 driving nearby and with roadside infrastructures. The communication module includes, but is not limited to, a communication module compliant with Dedicated Short-Range Communications (DSRC) and a communication module compliant with a mobile communication standard, such as the 4th Generation (4G) standard or the 5th Generation (5G) standard. The second communication interface 26 may be at least partially identical to the first communication interface 25.

The input interface 27 is an apparatus for receiving an input from a user who boards the vehicle 20. Through the input interface 27, a user may request coupling with another vehicle 20. Through the input interface 27, a user may also request coupling with any of service provision vehicles 60 providing specific services as described below. The input interface 27 includes devices, such as a touch panel, a keyboard, or a mouse. The input interface 27 is not necessarily essential. A user may install a dedicated application on the user terminal 50 in the possession of the user and operate the user terminal as an input interface 27.

The display 28 displays various types of information to a user who boards the vehicle 20. For example, the display 28 may display, to a user who is supposed to move between vehicles 20, a message prompting the user to move. The display 28 may display options that can be inputted through the input interface 27. The options displayed by the display 28 may include coupling with another vehicle 20, coupling with a service provision vehicle 60, and release of coupling with the vehicle 20 and the service provision vehicle 60. The display 28 includes a display for presenting display images based on signals from the vehicle controller 21. The display includes, but is not limited to, a Liquid Crystal Display (LCD), an organic Electro-Luminescence (EL) display, an inorganic EL display, and a Plasma Display Panel (PDP). The display 28 is not necessarily essential. A user may install a dedicated application on the user terminal 50 in the possession of the user and operate the user terminal as a display 28 together with an input interface 27.

The coupling 29 mechanically couples the vehicle 20 and another vehicle 20 or a service provision vehicle 60. The coupling 29 includes a coupler which can be coupled and uncoupled under the control of the vehicle controller 21. The coupling 29 may be provided with a passage through which a user can move between adjacent vehicles 20. Vehicles 20 may be configured so that a user can move between the insides of two coupled vehicles 20.

Vehicles 20 do not necessarily need to include a mechanical connection 29. In that case, in a coupled state, two vehicles 20 drive closely in a line by electronic control. In the present application, a coupled state includes a state of driving closely in a line. Thus, a coupled state also includes a state of not being mechanically connected.

Figure 6:
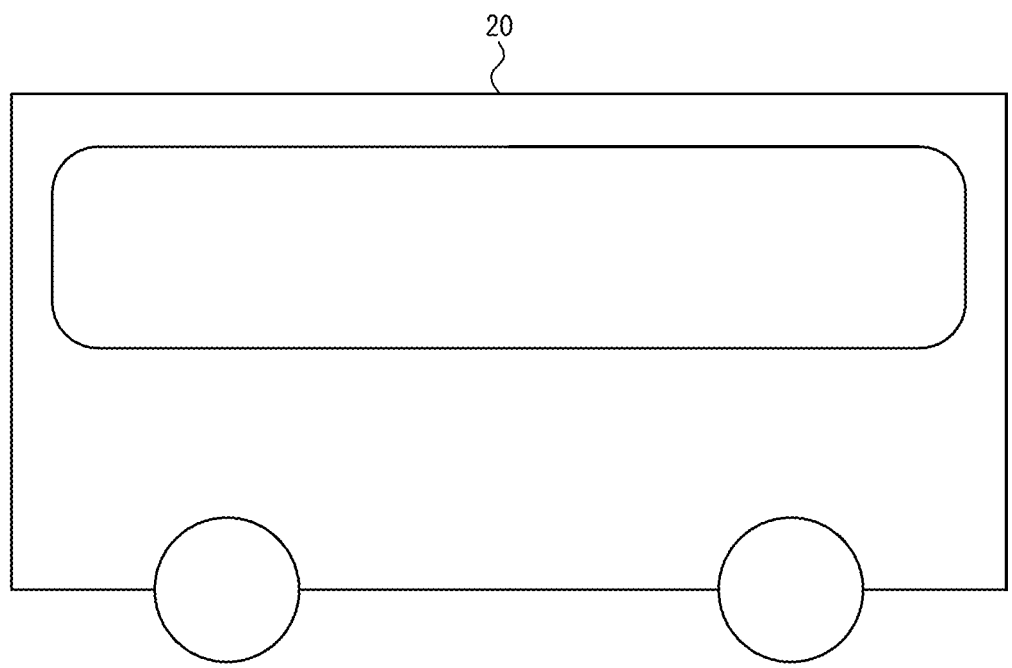
FIG. 6 is a side view illustrating an example appearance of the vehicle of FIG. 1.
Figure 7:
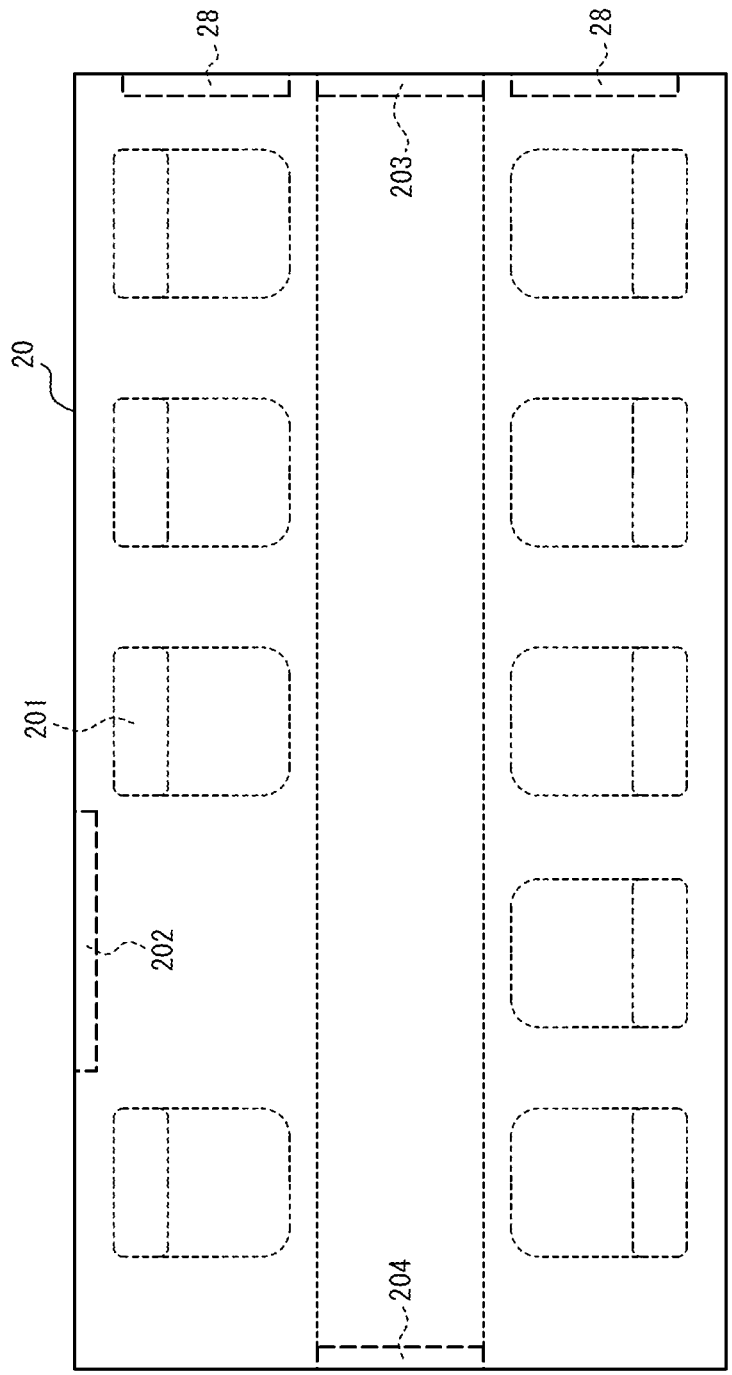
FIG. 7 is a top view illustrating an example appearance of the vehicle of FIG. 1.
Figure 8:
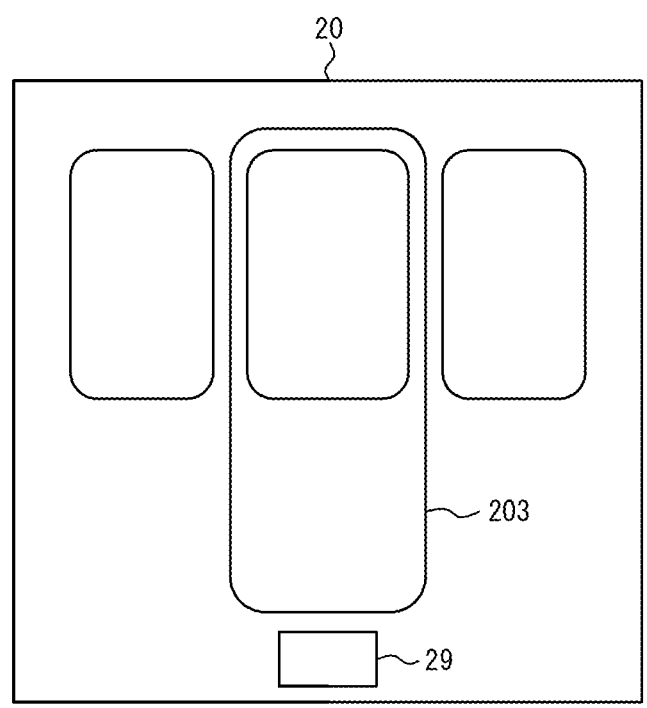
FIG. 8 is a front view illustrating an example appearance of the vehicle of FIG. 1.

With reference to FIG. 6 to FIG. 8, an example of a vehicle 20 will be described. FIG. 6 to FIG. 8 do not limit the configuration of a vehicle 20.

As illustrated in FIG. 6 to FIG. 8, a vehicle 20 may be an automated driving vehicle that does not have a driver's seat or that has the steering wheel, the accelerator and the brake stored in positions that are not visible. As illustrated in FIG. 7, a plurality of seats 201 may be arranged in the cabin. The arrangement of the seats 201 is freely selected. The seats 201 may be arranged to face each other so as to facilitate communication between users. Further, a display 28 may be arranged at any position in the vehicle 20, such as in an upper part on the front side of the cabin that typically faces a direction of travel.

As illustrated in FIG. 7, a door 202, through which users can board and alight, may be provided at any position on a side surface of the vehicle body of the vehicle 20. As illustrated in FIG. 7 and FIG. 8, a front door 203 may be provided on the front side of the vehicle 20. A rear door 204 may be provided on the rear side of vehicle 20. The front door 203 and the rear door 204 may be opened by lateral sliding movement. The front door 203 may be configured to be opened when the vehicle 20 on the front side thereof is coupled with another vehicle 20 by the coupling 29. The rear door 204 may be configured to be opened when the vehicle 20 on the rear side thereof is coupled with another vehicle 20. When two vehicles 20 are coupled in a line and when a front door 203 and a rear door 204 facing each other are opened, a user can move between the insides of the two coupled vehicles 20. Opening and closing of front doors 203 and rear doors 204 in vehicles 20 may be controlled by the server controller 12 of the server 10.

To allow a user to safely move between two coupled vehicles 20, a front door 203 and a rear door 204 facing each other in the two coupled vehicles 20 may be coupled with tight spacing in a state in which the front door 203 and the rear door 204 are opened. Alternatively, vehicles 20 may be configured so that, when two vehicles 20 are coupled, a bellows-shaped member may be extended and fixed at least from one of the vehicles 20 to the other vehicle 20 so as to cover the entire circumference of a floor plate and a passage for a user to pass.

A vehicle 20 herein is not limited to a vehicle as illustrated in FIG. 6 to FIG. 8 that allows a user to move between two coupled adjacent vehicles 20 that are platooning. A plurality of coupled vehicles 20 may remain stationary at any place in a case in which, although a user cannot move between two coupled vehicles 20 that are platooning, a transfer from vehicle 20 to vehicle 20 needs to be made in order for the user to go to the destination. The user can transfer from vehicle 20 to vehicle 20 on foot. The server controller 12 of the server 10 may perform control so that a plurality of vehicles 20 that have formed a platooning vehicle group 30 can remain stationary, thereby allowing the user to move between two vehicles 20.

(User Terminal)

A user terminal 50 is an information terminal including an input/output interface, an information processor, a communication interface, and a position detector. As the user terminal 50, for example, a general-purpose portable information terminal, such as a smartphone, may be used. The input/output interface includes, for example, a liquid crystal display with a touch panel. The user terminal 50 can accept an input from the user through the input/output interface and display, to the user, information processed by the user terminal 50. The information processor includes a processor. The information processor executes various types of information processing in the user terminal 50. The communication interface includes, for example, a wireless communication module compliant with a communication method for the network 40. The user terminal 50 can communicate with the server 10 via the network 40 using the communication interface. The user terminal 50 may communicate with a vehicle 20 via the network 40. The position detector of the user terminal 50 includes a GPS receiver and is capable of detecting the position of user terminal 50 itself.

The user terminal 50 may run an application for using services provided by the vehicle operation management system 1. In accordance with the application, the user terminal 50 can handle input of information from the user, output of information to the user, and transmission and receipt of information to and from the server 10. The user can acquire the application from an operator providing the automated driving and ride-sharing service.

The user terminal 50 may include a means for communicating with a vehicle 20 without using the network 40. The user terminal 50 may communicate directly with a vehicle 20 when the user boards the vehicle 20 and transmit and receive information for verifying whether the vehicle 20 is a vehicle 20 allocated to the user.

(First Example of Vehicle Operation Management)

Figure 9:
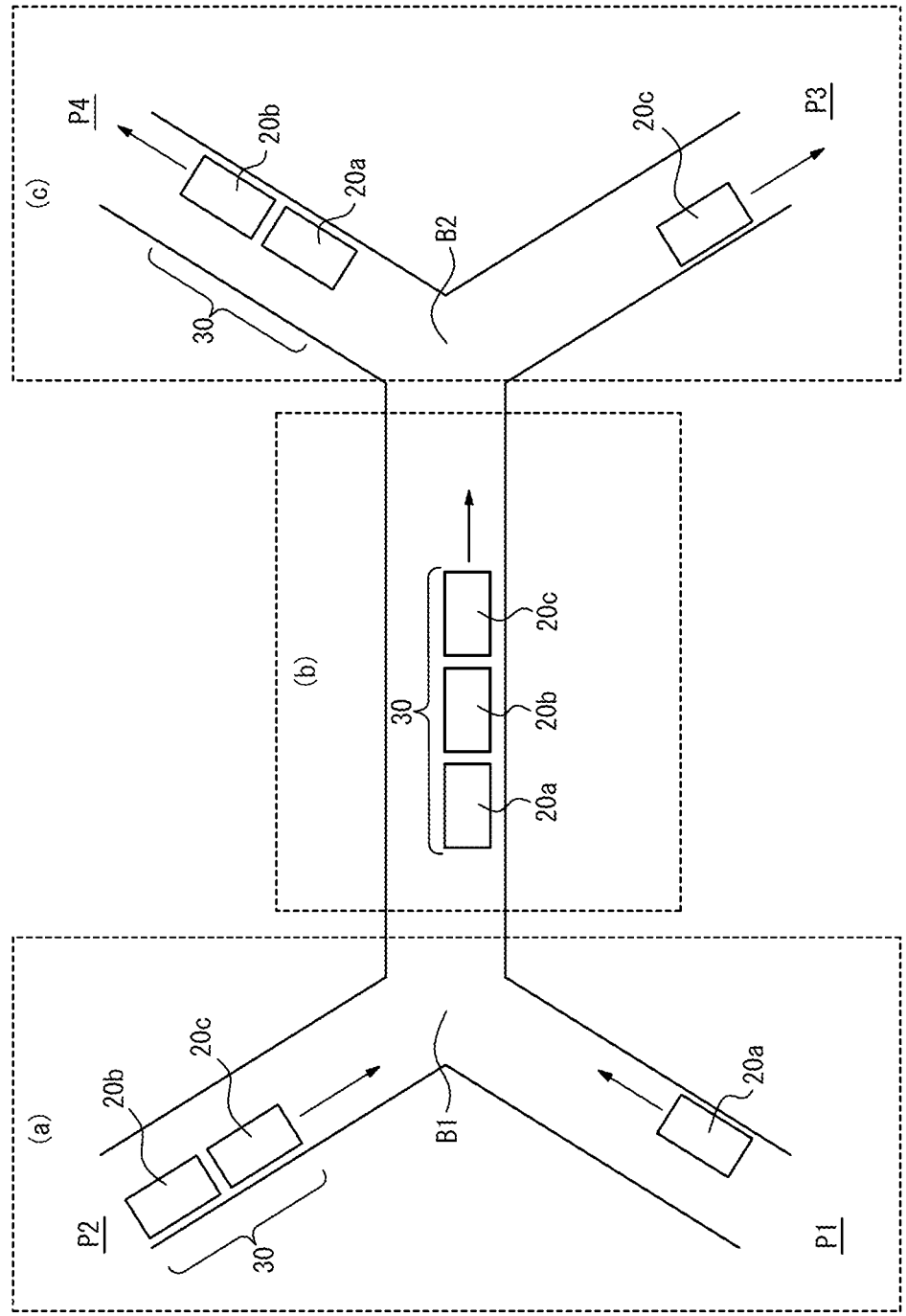
FIG. 9 illustrates how a plurality of vehicles according to an embodiment are coupled and separated.

Next, with reference to FIG. 9, an example of operation of a plurality of vehicles 20 according to the vehicle operation management system 1 will be described. In FIG. 9, it is assumed that first point P1 is connected to the first junction B1 by a road, and the second point P2 is connected to the first junction B1 by another road. It is also assumed that the third point P3 is connected to the second junction B2 by a road, and the fourth point P4 is connected to the second junction B2 by another road. It is also assumed that the first junction B1 and the second junction B2 are connected by a single road. It is assumed that, when a user wants to request the vehicle operation management system 1 for transport from the first point P1 to the third point P3, a vehicle 20a, a vehicle 20b, and a vehicle 20c are being operated by the vehicle operation management system 1. The vehicle 20a and the vehicle 20b respectively correspond to the first vehicle and the second vehicle. Herein, the vehicle 20a is a vehicle heading from the first point P1 to the fourth point P4. The vehicle 20b is a vehicle heading from the second point P2 to the fourth point P4. The vehicle 20c is a vehicle heading from the second point P2 to the third point P3. As illustrated by (a) surrounded by a broken line in FIG. 9, it is assumed that the vehicle 20b and the vehicle 20c have formed a vehicle group 30 platooning between the second point P2 and the first junction B1, before the vehicle 20a and the vehicle 20b are coupled.

If the vehicle 20a, the vehicle 20b, and the vehicle 20c are driving independently and individually, there would be no vehicle that could be boarded by a user to travel from the first point P1 to the third point P3. According to the vehicle operation management system 1 of the present disclosure, however, as illustrated by (b) surrounded by a broken line in FIG. 9, the vehicle 20a and the vehicle 20b can be controlled by the server to be coupled 10 between the first junction B1 and the second junction B2. Thus, the vehicles 20a-20c can be turned into a platooning vehicle group 30. In this state, the user can transfer from the vehicle 20a to the vehicle 20c. The user may move from the inside of the vehicle 20a to the inside of the vehicle 20c. Alternatively, the vehicle group 30 may temporarily remain stationary at an appropriate place, and the user may transfer from the vehicle 20a to the vehicle 20c on foot. Before the second junction B2, the vehicle group 30 consisting of the vehicle 20a-20c separates into the vehicles 20a, 20b and the vehicle 20c. As illustrated by (c) surrounded by a broken line in FIG. 9, after passing through the second junction B2, the vehicle 20a and the vehicle 20b head toward the fourth point P4, and the vehicle 20c heads toward the third point P3. Thus, the user can board the vehicle 20c and travel to the third point P3.

In this way, according to the vehicle operation management system 1 of the present disclosure, it is possible to transport a user from the vehicle 20a to the vehicle 20c by coupling a plurality of vehicles, that is, the vehicle 20a and the vehicle 20b. Accordingly, in the vehicle operation management system 1 of the present disclosure, a user is more likely to be able to travel to his or her destination. Further, in a case in which multiple vehicles 20 are driving at the same time, more options are available for selection of vehicles 20 that can be used for transport. Consequently, a user is more likely to be able to arrive at his or her destination early. As described above, the vehicle operation management system 1 of the present disclosure can enhance convenience for transport in a service in which a plurality of vehicles 20 is shared and used by a plurality of users. Further, in the vehicle operation management system 1, because a plurality of vehicles 20 on a common route can be coupled so as to drive as a platooning vehicle group 30, occupied areas on the roads are less compared to a case in which the vehicles 20 drive individually. The vehicle operation management system 1 can therefore help prevent traffic congestion.

(First Example of Vehicle Operation Management Method)

Figure 10:
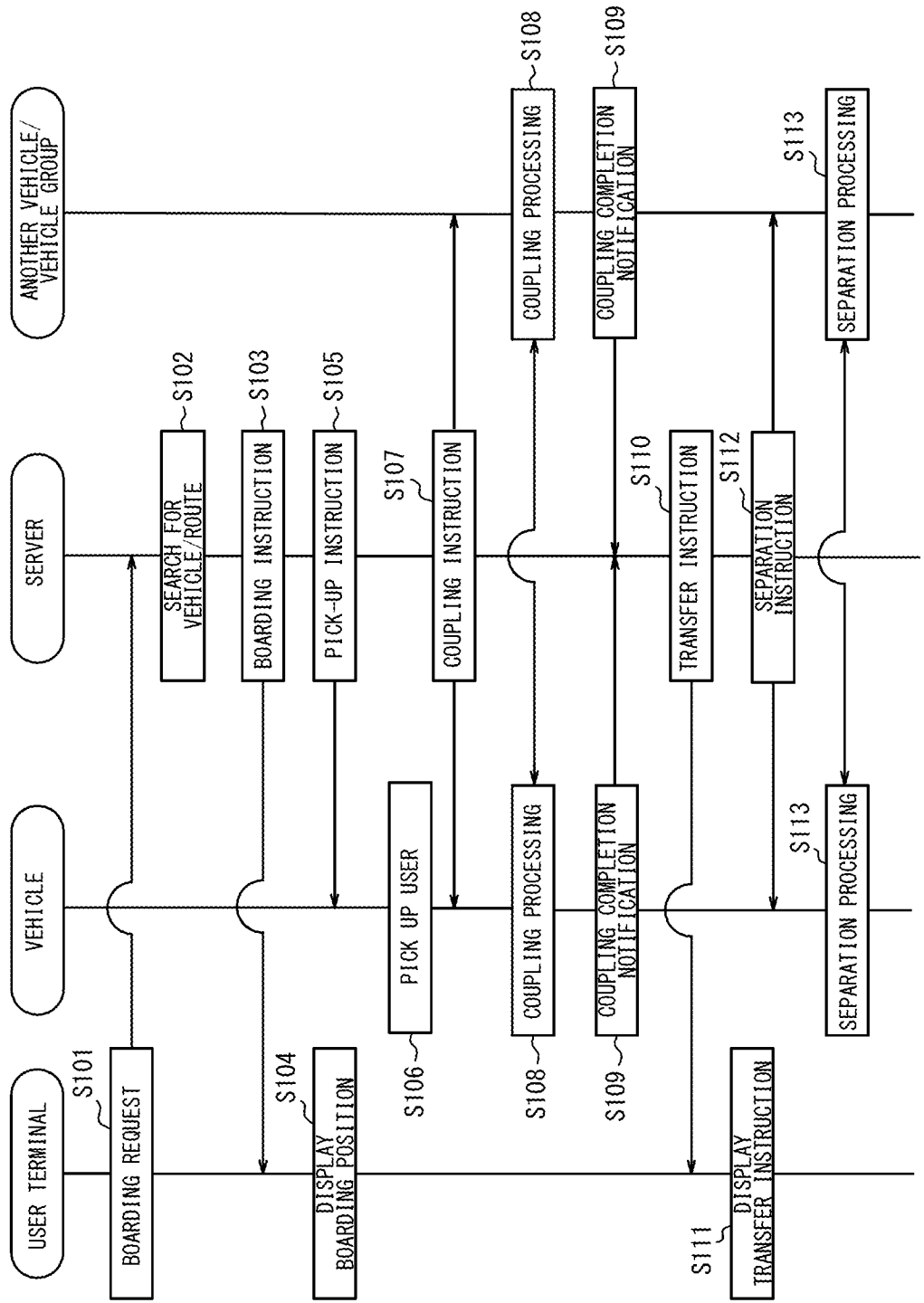
FIG. 10 illustrates an example of processing for managing operation of a plurality of vehicles in response to a request from a user.

With reference to FIG. 10, an example of processing for the automated driving and ride-sharing service involving a transfer between vehicles 20 as illustrated in FIG. 9 will be described.

First, a user operates the user terminal 50 to launch an application for using the automated driving and ride-sharing service. In accordance with the application, the user inputs, to the user terminal 50, destination information indicating the position of the destination. The user terminal 50 may acquire, as current position information, information indicating the position of the current location using the position detector of the user terminal 50 itself. The user terminal 50 transmits, to the server 10, a boarding request including the current position information and the destination information (Step S101). Departure point information may be inputted to the user terminal 50 by the user instead of being automatically acquired by the user terminal 50.

Upon receiving the boarding request from the user terminal 50, the server 10 searches for a route to travel from the departure point to the destination by boarding one or more vehicles 20, taking into account a transfer between a plurality of vehicles 20 (Step S102). For example, the server 10 search the route information included in the vehicle information for a vehicle 20 that is driving in the vicinity of the departure point of the user and for a vehicle 20 that is scheduled to pass through the vicinity of the destination after an appropriate period of time. Further, the server 10 determines whether it is possible to transfer from a vehicle 20 driving in the vicinity of the departure point to a vehicle 20 scheduled to drive in the vicinity of the destination by transferring between a plurality of vehicles 20 on a route from the departure point to the destination point. The server 10 searches the usage situation information included in the vehicle information for a vehicle 20 that the user can board from among vehicles 20 having vacant seats 201. The server 10 excludes, if any, vehicles 20 that contains user limitation information in their vehicle information and therefore cannot be boarded by the user.

As an example, in the example illustrated in FIG. 9, the server 10 extracts the vehicle 20a that is passing through the vicinity of the first point P1, which is the departure point, and the vehicle 20c that is going to pass through the vicinity of the third point P3, which is the destination. Because the route information for the vehicle 20a and the route information for the vehicle 20c are overlapped between the first junction B1 and the second junction B2, the server 10 determines that a transfer can be made between the vehicle 20a and the vehicle 20c. Consequently, the server 10 extracts a route to travel to the destination with a transfer from the vehicle 20a to the vehicle 20c.

After determining the vehicle 20a and the vehicle 20c that the user can board to travel to the destination and the route, the server 10 transmits, to the user terminal 50, a boarding instruction including information regarding the boarding position of the vehicle 20a and regarding the boarding vehicle 20a (Step S103). The information regarding the vehicle 20a may include information regarding the type and the appearance of the vehicle 20a and information that electronically identifies the vehicle 20a. The server 10 may further transmit, to the user terminal 50, a scheduled arrival time at the destination and information regarding the transfer.

Upon receiving the boarding instruction, the user terminal 50 displays, on the input/output interface, the information regarding the boarding position of the vehicle 20a (Step S104). The user terminal 50 may further display the information regarding the vehicle type and the appearance of the vehicle 20a. The user terminal 50 may further display the scheduled arrival time at the destination and the information regarding the transfer. Further, the server 10 may sequentially transmit, to the user terminal 50, current position information for the vehicle 20a. The user terminal 50 may display the current position of the vehicle 20a on a map. This enables the user to confirm that the vehicle 20a for boarding is approaching.

Before or after Step S103 of transmitting the boarding instruction to the user terminal 50, the server 10 transmits, to the vehicle 20a, an instruction to pick up the user (Step S105). The server 10 may proceed to Step S105 only when the server 10 has received information indicating that the user has accepted the content displayed in Step S104. Upon receiving the instruction to pick up the user, the vehicle 20a boards the user at the boarding position (Step S106). The vehicle 20a and the user terminal 50 may authenticate each other in any manner.

When the vehicle 20a with the user on board enters a section on the route in which coupling with another vehicle 20b is possible, the server 10 transmits, to both or one of the vehicle 20a and the vehicle 20b, a coupling instruction for coupling (Step S107). In the example of FIG. 9, the section in which coupling is possible is a section between the first junction B1 and the second junction B2. In a case in which the server 10 transmits the coupling instruction to one of the vehicle 10a and the vehicle 10b, the coupling instruction is transmitted to the other vehicle 10a or 10b. In a case in which the vehicle 20b is driving with the vehicle 20c as a vehicle group 30 in a coupled state, the server 10 may instruct the vehicle 20c, instead of, or in addition to, the vehicle 20b, to couple.

When both or one of the vehicle 20a and the vehicle 20b receives the coupling instruction from the server 10, the vehicle 20a and the vehicle 20b perform coupling processing for coupling with each other (Step S108). The respective vehicle controllers 21 of the vehicle 20a and the vehicle 20b may exchange information regarding their positions, speeds, or the like detected by the in-vehicle sensors 23 and the position detectors 24 via the respective second communication interfaces 26 using vehicle-to-vehicle communication. The respective vehicle controllers 21 of the vehicle 20a and the vehicle 20b control the ECUs 22 for the components and exchange control information through the respective second communication interfaces 26, to thereby transitioning to a coupled state. Thus, the vehicle 20a, the vehicle 20b, and the vehicle 20c form a vehicle group 30 for platooning.

Coupling of the vehicle 20a and the vehicle 20b does not necessarily need to occur during driving. For example, the vehicle 20b and the vehicle 20c may select a wide part of the road between the first junction B1 and the second junction B2 and remain stationary at the road shoulder so as to wait for the arrival of the vehicle 20a. The vehicle 20a may be coupled with the vehicle 20b, while the vehicle 20b and the vehicle 20c are stationary.

Upon completion of coupling between the vehicle 20a and the vehicle 20b, completion of the coupling is notified to the server 10 from the vehicles 20a and 20b (Step S109) and the server 10 transmits, to the user terminal 50, a transfer instruction indicating that the user should transfer from vehicle to vehicle (Step S110). Upon receiving the transfer instruction, the user terminal 50 displays the transfer instruction on the input/output interface (Step S111). The user terminal 50 may display the transfer instruction with sound and/or vibration. Additionally, in addition to transmitting the transfer instruction to the user terminal 50 or instead of transmitting the transfer instruction to the user terminal 50, the server 10 may transmit, to the vehicle 20a, the transfer instruction to the user. The vehicle 20a may display, on the display 28, the transfer instruction to the user. These processes let the user know that he or she should transfer from the vehicle 20a to the vehicle 20c.

In a case in which the vehicles 20a-20c are coupled so that one can move between the insides of the vehicles 20a-20c as has been described based on illustration in FIG. 6 to FIG. 8, the user may move from the vehicle 20a to the vehicle 20c while the vehicles 20a-20c are driving. The server 10 may transmit, to at least one of the vehicles 20a-20c, an instruction to control opening and closing of the front doors 203 and the rear doors 204 of the vehicles 20a-20c, so that the user can move. In a case in which the user cannot move between the insides of the vehicles 20a-20c, the server 10 may transmit, to at least one of the vehicles 20a-20c, an instruction to make the vehicles 20a-20c temporarily stationary, so that the user can move between the vehicles on foot.

At an appropriate time after completion of the transfer by the user from the vehicle 20a to the vehicle 20c, the server 10 transmits, to at least one of the vehicle 20a, the vehicle 20b, and the vehicle 20c, a separation instruction to release at least part of the coupled state of the vehicle group 30 (Step S112). The server 10 may transmit an instruction to release coupling between two vehicles 20 that have been coupled by Step S108. Vehicles between which coupling is released are not limited to two vehicles 20 that have been coupled by Step S108. In the example of FIG. 9, coupling between the vehicle 20b and the vehicle 20c is released before the second junction B2. The server 10 may therefore transmit a separation instruction to the vehicle 20b and the vehicle 20c.

Upon receiving a separation instruction, each vehicle 20 releases its coupled state in accordance with an instruction from the server 10 (Step S113). In the example of FIG. 9, the respective vehicle controllers 21 of the vehicle 20b and the vehicle 20c cooperate so as to release the coupled state between the vehicle 20b and the vehicle 20c. Thus, from the second junction B2, the vehicle 20a and the vehicle 20b head toward the fourth point P4, and the vehicle 20c heads toward the third point P3. This enables the user who boards the vehicle 20c to arrive at the destination.

The above vehicle operation management system 1 according to the first example is described as being related to the automated driving and ride-sharing service for transporting persons. A similar mechanism, however, can be applied to delivery of products. To transport products between a plurality of vehicles 20, the vehicles 20 need to be boarded by persons or need to be equipped with mechanisms for transporting the products.

The vehicle operation management system 1 can be applied not only to simple roads as illustrated in FIG. 9 but also to mesh-like complex roads. Upon receiving a boarding request from the user terminal 50, the server controller 12 of the server 10 can combine routes along which different vehicles 20 travel, so as to select an optimum route that can be used to arrive at the destination as soon as possible. The server controller 12 may also consider cost reduction to be important and select a more economical route rather than the shortest route.

In the above Step S102, the server 10 searches for a vehicle 20 that the user can board, in accordance with the destination of the user and the scheduled route of each vehicle 20. In extraction of a vehicle 20 that the user is to board, the server 10 may consider his or her user profile information. For example, in Step S102, the server 10 may extract a vehicle 20 in which his or her user profile information matches that of other users who are already on board the vehicle 20. The server 10 may determine that the user profile information matches when the geographic information, the demographic information, and/or the psychographic information included in the user profile information is common or similar. For example, the server 10 may extract a vehicle 20 in which other users are similar in age, a vehicle 20 in which other users have a common hobby, etc. This can activate communication between the user and other users during transport and improve the comfort of travelling for the user.

(Second Example of Vehicle Operation Management Method)

Figure 11:
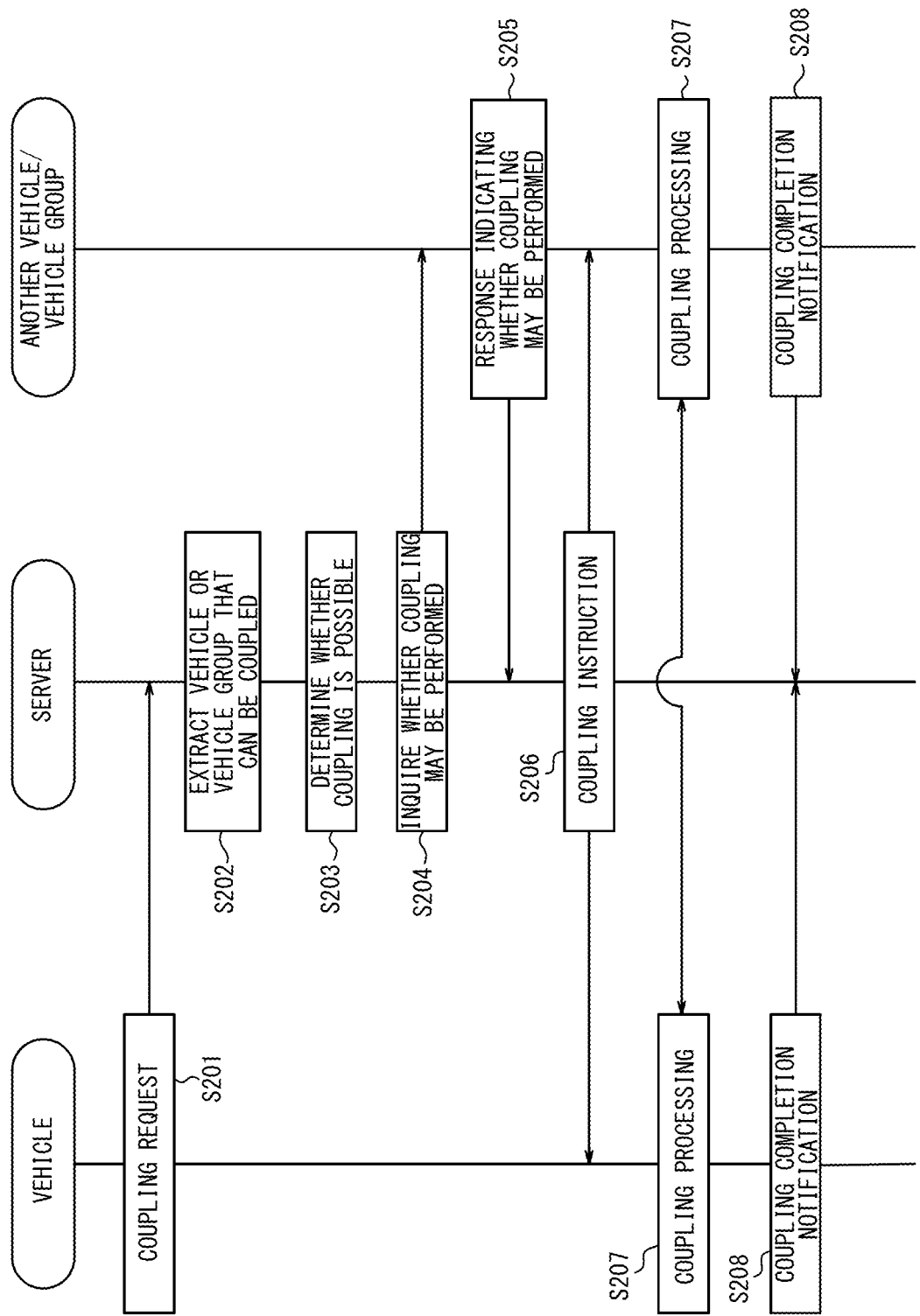
FIG. 11 illustrates an example of processing for coupling a plurality of vehicles that is started by a request from a vehicle.

The vehicle operation management system 1 may couple a plurality of vehicles 20 travelling in the direction of the same destination so as to activate communication between users who board the travelling vehicles 20. In this case, the server 10 may control coupling and release of the coupling between a plurality of vehicles 20 based on requests from users who board the vehicles 20. An example will be described with reference to FIG. 11.

It is assumed that a plurality of vehicles 20 is being travelling according to the automated driving and ride-sharing service. A user who boards a vehicle 20a in the plurality of vehicles 20 transmits, to the server 10, a coupling request for coupling with another vehicle 20 or with a platooning vehicle group 30 including another vehicle 20 (Step S201). The coupling request may be inputted, for example, by any user who boards the vehicle 20a through the input interface 27 included in the vehicle 20. The user may request coupling with either many unspecified vehicles 20 or a vehicle group 30. Alternatively, the user may request coupling by concretely specifying another vehicle 20. Additionally, the user may transmit such a request from the user terminal 50. With reference to FIG. 1, a vehicle 20a from which the coupling request is transmitted corresponds to the first vehicle and is hereinafter referred to as the vehicle 20a. A vehicle 20b that is to be coupled with the vehicle 20a corresponds to the second vehicle. The vehicle 20b may also be in a coupled state with another vehicle 20c, thereby forming a vehicle group 30. The vehicle 20b that is to be coupled with the vehicle 20a is selected from vehicles 20 other than the vehicle 20a.

Reasons for the user who boards the vehicle 20a to request coupling with another vehicle 20 include communicating with friends or family who are on board the other vehicle 20 or the vehicle group 30, expanding interactions with other users who use the automated driving and ride-sharing service, and the like.

Coupling of the vehicles 20a, 20b can be started by the server 10 rather than a request from the vehicle 20a. The server 10 may couple several vehicles 20a-20c for platooning so as to improve the comfort of travelling for the user and improve satisfaction of the user.

Upon receiving the coupling request from the vehicle 20a, the server 10 extracts another vehicle 20 that can be coupled (Step S202). Another vehicle 20 that can be coupled may be selected from vehicles 20 heading in the same direction, based on destination information for each user. Another vehicle 20 that can be coupled includes a group of vehicles 20 included in a vehicle group 30. The server 10 may extract a plurality of other vehicles 20 that can be coupled. In a case in which the user has concretely specified the target vehicle 20b to be coupled in Step S201, Step S202 and the next Step S203 are omitted.

Figure 12:
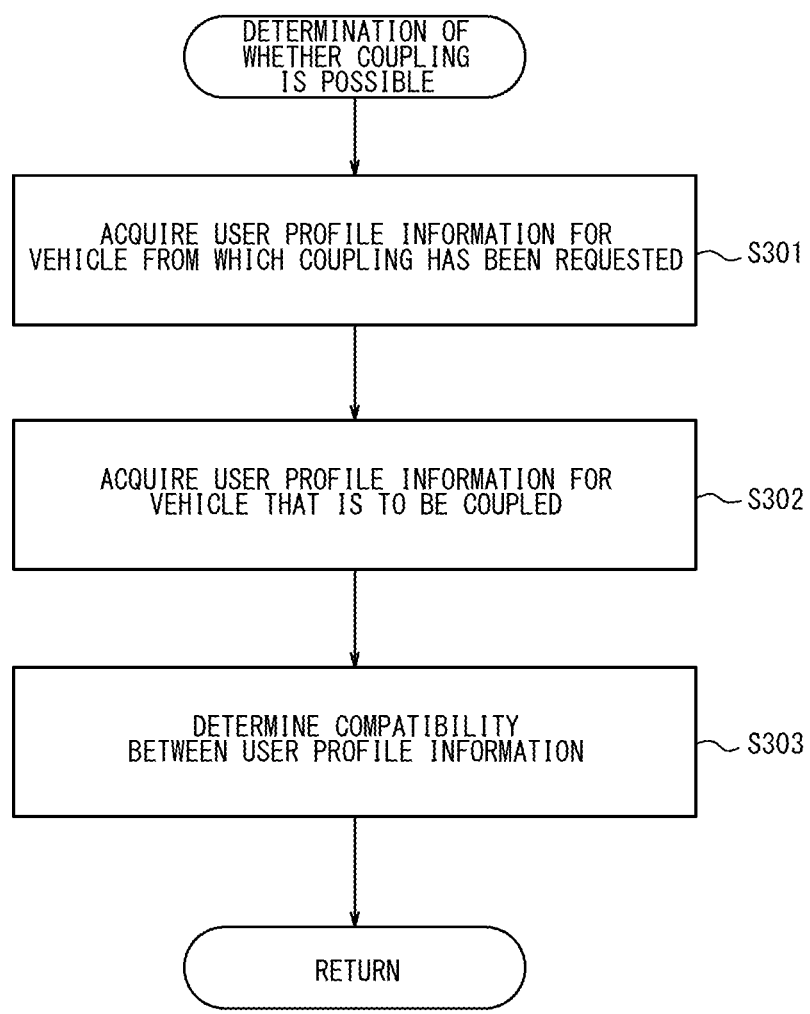
FIG. 12 illustrates an example of a method, performed by the server, for determining whether coupling is possible.

Subsequently, the server 10 determines whether coupling of the vehicle 20a and another vehicle 20 is possible (Step S203). Whether coupling is possible may be determined, for example, based on FIG. 12. In the following, an example of a method, performed by the server 10, for determining whether coupling is possible will be described with reference to FIG. 12.

First, the server 10 acquires user profile information for users who are on board the vehicle 20a from which coupling has been requested (Step S301). For example, the server 10 acquires the user ID of each user who is on board by referring to the usage situation information included in the vehicle information for the vehicle 20a as illustrated in FIG. 3. The server 10 acquires user profile information for the user corresponding to each user ID by referring to the user information illustrated in FIG. 4.

Subsequently, the server 10 acquires user profile information for users who are on board another vehicle 20 that is to be coupled (Step S302). The server 10 may acquire user profile information in a manner similar to Step S301.

Subsequent to Step S302, the server 10 determines compatibility between the user profile information acquired in Step S301 for the users of the vehicle 20a and the user profile information acquired in Step S302 for the users of another vehicle 20 (Step S303). When it is determined that compatibility between the user profile information is high, the server 10 determines that the vehicle 20a and another vehicle 20 may be coupled. Another vehicle 20 to be coupled is set to be the vehicle 20b included in the vehicle group 30.

Determination of compatibility between the users of the vehicle 20a and the users of another vehicle 20 in terms of user profile information may be made in various ways. For example, the server 10 may quantify a similarity between the user profile information for the users of the vehicle 20a and the user profile information for the users of another vehicle 20. The server 10 may determine that coupling is possible when the quantified similarity is greater than a predetermined value. In this way, the server 10 may determine a vehicle 20b to be coupled by evaluating a similarity in terms of user profile information. Alternatively, by referring to connection information for each user of the vehicle 20a and connection information for each user of the other vehicle 20, the server 10 may determine that coupling is possible when a predetermined number or more users who are connected to each other are on board.

User profile information used in determination of compatibility may be specified by a user of the vehicle 20a in Step S201. For example, the user may specify that coupling can be made possible when a similarity in geographic information is high, so as to interact with persons from a specific region.

Further, in the vehicle information illustrated in FIG. 3, another vehicle 20b that is to be coupled with the vehicle 20a can be associated with user limitation information for limiting users who can board. In that case, the server controller 12 may determine that the vehicle 20a and the vehicle 20b can be coupled only when user profile information for every user who boards the vehicle 20a is compatible with the user limitation information associated with the vehicle 20b. In a case in which the vehicle 20b is further coupled with another vehicle 20c, the same applies to user limitation information associated with the vehicle 20c.

With reference back to FIG. 11, in a case in which it has been determined in Step S203 that the vehicle 20a and the vehicle 20b or the vehicle group 30 can be coupled, the server 10 may transmit, to the vehicle 20b or the vehicle group 30 that is to be coupled, an inquiry about whether the vehicle 20a may be coupled (Step S204). Making such an inquiry allows users of the vehicle 20b or the vehicle group 30 to prevent coupling with an unintended vehicle 20a. The inquiry from the server 10 may be displayed on the display 28 of the vehicle 20b. In the case in which the vehicle 20c is coupled with the vehicle 20b, the same inquiry may be displayed on the display 28 of the vehicle 20c. One, for example a representative, of users who board the vehicle 20b or the vehicle group 30 may transmit a response to the inquiry indicating whether to accept coupling through the input interface 27 (Step S205).

In a case in which coupling of the vehicle 20a and the vehicle 20b has been accepted in the Step S205, the server 10 transmits, to the vehicle 20a and/or the vehicle 20b, a coupling instruction (Step S206). Thereafter, in a manner similar to Step S108 and Step S109 described with reference to FIG. 10, coupling processing is performed for the vehicle 20a and the vehicle 20b (Step S207), and completion of the coupling is notified to the server 10 (Step S208).

By thus coupling the vehicle 20a and the vehicle 20b, users who board the vehicles 20a-20c can move between the vehicles 20a-20c. This can activate communication between users travelling to their destinations. For example, in a case in which a plurality of vehicles 20 is used by family or friends, convenience is improved because it is possible to go back and forth between the vehicles. Further, because the vehicles 20a-20c boarded by users with highly similar user profile information form a vehicle group 30, the users can talk about a common topic. For example, it is possible to promote interactions between users from the same region, between users who are fans of the same sports team, and the like. This can increase the joy and comfort of travelling for users of the automated driving and ride-sharing service and, moreover, can increase the attractiveness of services provided.

(Coupling with Service Provision Vehicle)

The vehicle operation management system 1 can provide additional services, such as dining or entertainment, in addition to a service for transporting persons. Additional services may be provided by service provision vehicles 60, which are independent automated driving vehicles. Although being basically configured similarly to vehicles 20, service provision vehicles 60 can provide services to users by using spaces within the vehicles. Service provision vehicles 60 can be arranged at more than one bases of the operator of the automated driving and ride-sharing service and can wait on standby for service provision requests from users.

Services provided by service provision vehicles 60 may include, for example, a dining service for providing food, and an entertainment service for providing entertainment. When, for example, a service provision vehicle 60 provides a dining service, the service provision vehicle 60 may include cooking equipment, food, beverages, tableware, tables, chairs, or the like. The service provision vehicle 60 may have, for example, a cook on board so that food can be cooked and served to its users. Alternatively, the service provision vehicle 60 may include a mechanism for carrying completed dishes and automatically placing the dishes on a table. Users can move from a vehicle 20 to the service provision vehicle 60 so as to enjoy dining. The entertainment service includes, for example, a cinema service and a karaoke service. Service provision vehicles 60 may include film showing equipment and/or karaoke equipment.

Figure 13:
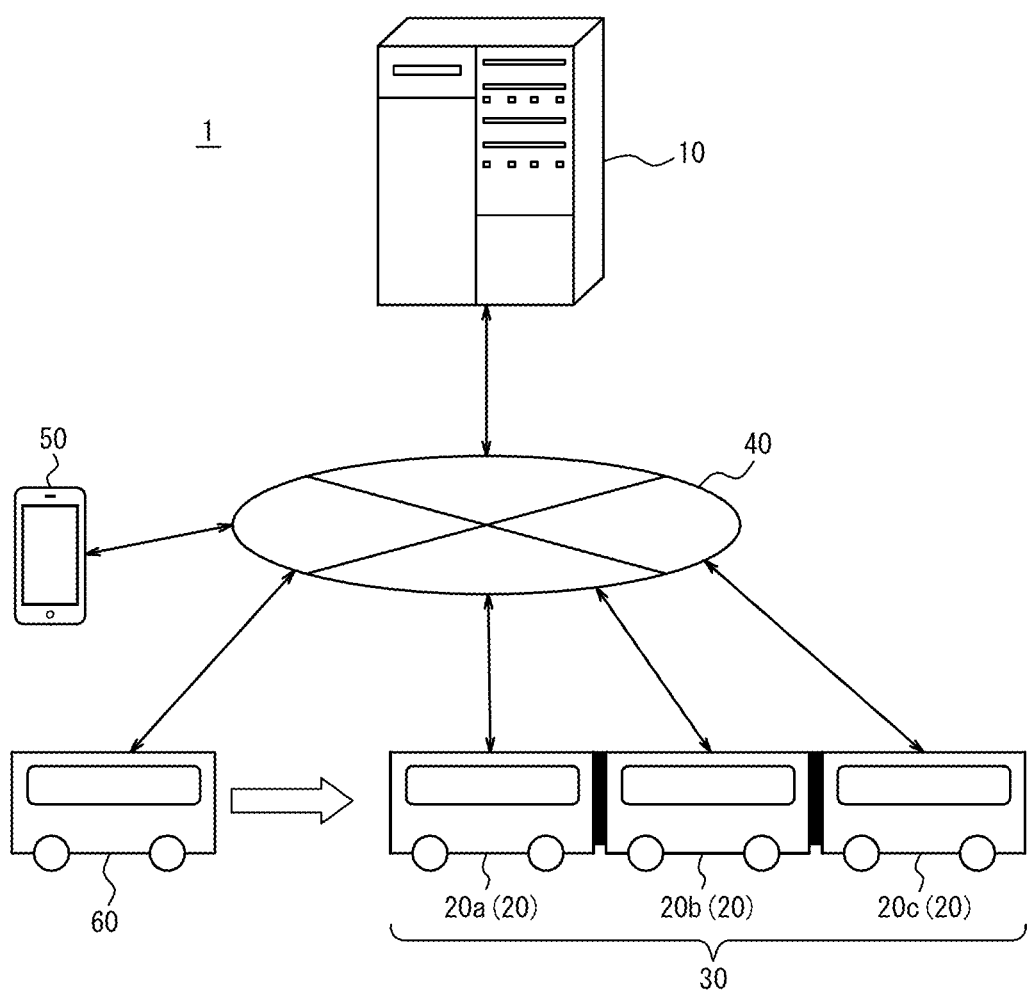
FIG. 13 schematically illustrates an example configuration of a vehicle operation management system including a service provision vehicle.

FIG. 13 illustrates an example of the vehicle operation management system 1 including a service provision vehicle 60 that is to be coupled with a vehicle 20a. In the example of FIG. 13, the vehicle 20a corresponds to the first vehicle. The service provision vehicle 60 may be considered to be the second vehicle. Although the vehicle 20a in FIG. 13 is included in a vehicle group 30, the vehicle 20a may be driving alone.

A user who boards a vehicle 20a may make a request to the server 10 for provision of a service by a service provision vehicle 60, using the input interface 27 included in the vehicle 20 or using the user terminal 50. Upon receiving the service provision request, the server controller 12 may instruct, via the server communication interface 11, that the vehicle 20 and the service provision vehicle 60 be coupled. Based on the request from the user, the service provision vehicle 60 is coupled with the vehicle 20a. Once the service provision vehicle 60 has finished providing the service, the coupled state may be released at any time upon a request from the user. The request from the user is inputted through the user terminal 50 or through the input interface 27 included in the vehicle 20a and transmitted to the server 10. The server controller 12 of the server 10 may issue an instruction to the service provision vehicle 60 to release the coupled state via the server communication interface 11.

As described above, because the provider of the automated driving and ride-sharing service can provide various services to users by using service provision vehicles 60, the convenience and satisfaction of the users are increased. Besides, by coupling a service provision vehicle 60, in which a plurality of users can gather, communication opportunities between users are further increased. For example, in a case in which a plurality of vehicles 20a-20c has formed a vehicle group 30 platooning as illustrated in FIG. 13, users gathered from the vehicles 20a-20c can interact in the service provision vehicle 60.

Additionally, the present disclosure is not limited to the above embodiment, and various modifications and revisions may be implemented. For example, functions or the like included in each means, each step, or the like can be rearranged without logical inconsistency, and a plurality of means, steps, or the like can be combined together or divided.

The methods disclosed herein may be at least partially performed by a processor included in the server 10 according to a program. Such a program may be stored in a non-transitory computer readable medium. Examples of non-transitory computer readable media may include, but are not limited to, a hard disk, RAM, ROM, flash memory, a CD-ROM, an optical storage device, and a magnetic storage device.

The invention claimed is:

1. A server that manages operation of a plurality of vehicles that are autonomous and used for transporting a plurality of users, the server comprising:
   a server communication interface configured to be able to transmit/receive information to/from the plurality of vehicles; and
   a server controller configured to be able to transmit, via the server communication interface, an instruction to couple a first vehicle and a second vehicle which are included in the plurality of vehicles to thereby form a vehicle group which includes the first vehicle and the second vehicle in a coupled state, and control the first vehicle and the second vehicle so that a user in either one vehicle of the first vehicle and the second vehicle can move to another vehicle, and an instruction to release at least part of the coupled state of the vehicle group;
   wherein the server controller is configured to control the vehicle group so that vehicles in the vehicle group drive together while the first vehicle and the second vehicle are in the coupled state;
   wherein the first vehicle and the second vehicle are configured to be mechanically coupled during the coupled state;
   wherein the first vehicle and the second vehicle are configured so that, during driving, the user can move between an inside of the first vehicle and an inside of the second vehicle while the first vehicle and the second vehicle are in the coupled state;
   wherein the server controller is configured to cause a message prompting the user to move between the first vehicle and the second vehicle to be displayed on a display; and wherein the server controller is configured to cause the display to display options that may be inputted through an input interface, the options including coupling with another vehicle, coupling with a service provision vehicle, and release of coupling with the vehicle and the service provision vehicle.

2. The server according to claim 1, wherein the server controller is configured to determine the second vehicle which is to be coupled with the first vehicle based on destination information for a user who boards the first vehicle and is configured to instruct the user who boards the first vehicle to move in the coupled state.

3. The server according to claim 1, wherein before the first vehicle and the second vehicle are coupled, the first vehicle and/or the second vehicle are/is in a coupled state with another vehicle.

4. The server according to claim 1, wherein when a coupling request from the first vehicle for coupling with another vehicle is received via the server communication interface, the server controller determines the second vehicle which is to be coupled with the first vehicle from among the plurality of vehicles.

5. The server according to claim 1, wherein the server controller is configured to determine the first vehicle and the second vehicle which are to be brought into the coupled state based on user profile information for a plurality of users who boards the plurality of vehicles.

6. The server according to claim 5, wherein the user profile information includes, for each user in the plurality of users, geographic information, demographic information, and/or psychographic information.

7. The server according to claim 5, wherein the server controller is configured to determine the second vehicle by evaluating a similarity between user profile information for one or more users in the plurality of users who board the first vehicle and user profile information for one or more users in the plurality of users who board the second vehicle.

8. The server according to claim 5, wherein the user profile information includes connection information indicating connections that each user in the plurality of users has with other users.

9. The server according to claim 5, wherein the plurality of vehicles is associated with user limitation information for limiting users who can board, and the server controller transmits an instruction to bring the first vehicle and the second vehicle into the coupled state only when user profile information for every user who boards the first vehicle is compatible with user limitation information associated with the second vehicle.

10. The server according to claim 1, wherein the plurality of vehicles includes, as the second vehicle, a service provision vehicle configured to provide a specific service in accordance with a request from the user, and when a coupling request from the first vehicle for coupling with the service provision vehicle is received via the server communication interface, the server controller instructs that the first vehicle and the service provision vehicle be coupled.

11. The server according to claim 10, wherein the service provision vehicle includes a vehicle configured to provide food and/or a vehicle configured to provide entertainment.

12. A vehicle operation management method for managing operation of a plurality of vehicles that are autonomous and used for transporting a plurality of users, the vehicle operation management method comprising:
coupling a first vehicle and a second vehicle which are included in the plurality of vehicles to thereby form a vehicle group which includes the first vehicle and the second vehicle in a coupled state;
controlling the first vehicle and the second vehicle so that a user in either one vehicle of the first vehicle and the second vehicle can move to another vehicle;
releasing at least part of the coupled state of the vehicle group;
controlling the vehicle group so that vehicles in the vehicle group drive together while the first vehicle and the second vehicle are in the coupled state;
displaying a message prompting the user to move between the first vehicle and the second vehicle on a display;
displaying options that may be inputted through an input interface, the options including coupling with another vehicle, coupling with a service provision vehicle, and release of coupling with the vehicle and the service provision vehicle,
wherein the first vehicle and the second vehicle are configured to be mechanically coupled during the coupled state; and
wherein during driving, the user can move between an inside of the first vehicle and an inside of the second vehicle while the first vehicle and the second vehicle are in the coupled state.

13. The vehicle operation management method according to claim 12, comprising
when a coupling request from the first vehicle for coupling with another vehicle is received, determining the second vehicle which is to be coupled with the first vehicle from among the plurality of vehicles.

14. The vehicle operation management method according to claim 12, wherein
the first vehicle and the second vehicle which are to be brought into the coupled state are determined based on user profile information for a plurality of users who boards the plurality of vehicles.

15. The vehicle operation management method according to claim 14, wherein
at least one vehicle in the plurality of vehicles is associated with user limitation information for limiting a condition for users who can board, and in a case in which the second vehicle is associated with the user limitation information, the first vehicle and the second vehicle are brought into the coupled state only when user profile information for every user who boards the first vehicle is compatible with the user limitation information associated with the second vehicle.

16. A vehicle operation management system comprising:
the server according to claim 1; and
the plurality of vehicles, operation of the vehicles being managed by the server, each vehicle of the plurality of vehicles comprising: a vehicle communication interface configured to be able to transmit/receive information to/from the server; and a vehicle controller configured to perform processing of being coupled with another vehicle that is included in the plurality of vehicles to thereby form a coupled state based on an instruction received from the server via the vehicle communication interface so that a user who boards can move between the vehicle and the other vehicle, and processing of releasing at least part of the coupled state with the other vehicle.

17. The server according to claim 1, wherein, when a vehicle with the user on board enters a section on the route in which coupling with another vehicle is possible, the server controller transmits, to the first vehicle and the second vehicle, coupling instructions for coupling.

18. The server according to claim 1, wherein the server controller is configured to release doors facing together between the inside of the first vehicle and the inside of the second vehicle during the coupled state.

\* \* \* \* \*